United States Patent
Jameson et al.

(10) Patent No.: US 9,521,063 B2
(45) Date of Patent: Dec. 13, 2016

(54) METHOD AND SYSTEM FOR ENHANCED INTERNET PROTOCOL ADDRESS AGGREGATION

(75) Inventors: Dwight Jameson, Ottawa (CA); Michael Aalders, Nepean (CA); Patrik Lahti, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 3288 days.

(21) Appl. No.: 11/508,660

(22) Filed: Aug. 23, 2006

(65) Prior Publication Data

US 2008/0049717 A1    Feb. 28, 2008

(51) Int. Cl.
| | |
|---|---|
| G06F 15/16 | (2006.01) |
| H04L 12/701 | (2013.01) |
| H04L 12/28 | (2006.01) |
| H04L 12/715 | (2013.01) |

(52) U.S. Cl.
CPC ............ *H04L 45/00* (2013.01); *H04L 12/2856* (2013.01); *H04L 12/2874* (2013.01); *H04L 45/04* (2013.01)

(58) Field of Classification Search
CPC .............................. H04L 45/04; H04L 12/2856
USPC ........................................................ 709/238
See application file for complete search history.

(56) References Cited

U.S. PATENT DOCUMENTS

| | | | |
|---|---|---|---|
| 6,928,485 B1* | 8/2005 | Krishnamurthy et al. | ... 709/242 |
| 7,013,338 B1* | 3/2006 | Nag et al. | ...... 709/226 |
| 2006/0268681 A1* | 11/2006 | Raza | ............ 370/216 |

* cited by examiner

*Primary Examiner* — Adnan Mirza (57) ABSTRACT

The present invention advantageously provides a method, system and apparatus for aggregating multiple site-specific routes, by determining a first aggregate-aware route that includes a prefix of a site-specific address and a prefix length of an aggregate route address of a first service provider. The method and system can be implemented as an enhancement to existing IP protocols such as BGP and other inter-domain routing protocols. The method and apparatus may further include applying a routing protocol policy in which an aggregate route may serve as a proxy for an aggregate-aware route when the address of the aggregate route matches the address of the aggregate-aware route. The method and system may yet further include determining a second aggregate-aware route that includes the prefix of the aggregate route address of the first service provider and a prefix length of a second aggregate route address of a second service provider. The method and system may yet still further include determining a first aggregate-aware route that includes at least two autonomous system identifiers from a multi-homing zone and a multi-homing zone diameter.

26 Claims, 10 Drawing Sheets

| a:b:1:: | 48 | 32 | 100 | 101 | 3 |
|---|---|---|---|---|---|
| Site Prefix | Site Prefix Length | Aggregate Prefix Length | MZ AS List | | MZ Diameter |

METHOD AND SYSTEM FOR ENHANCED INTERNET PROTOCOL ADDRESS AGGREGATION

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to communication networks, and more particularly to a method, system and apparatus that provides for aggregating multiple site-specific routes within an addressing architecture.

BACKGROUND OF THE INVENTION

Figure 1:
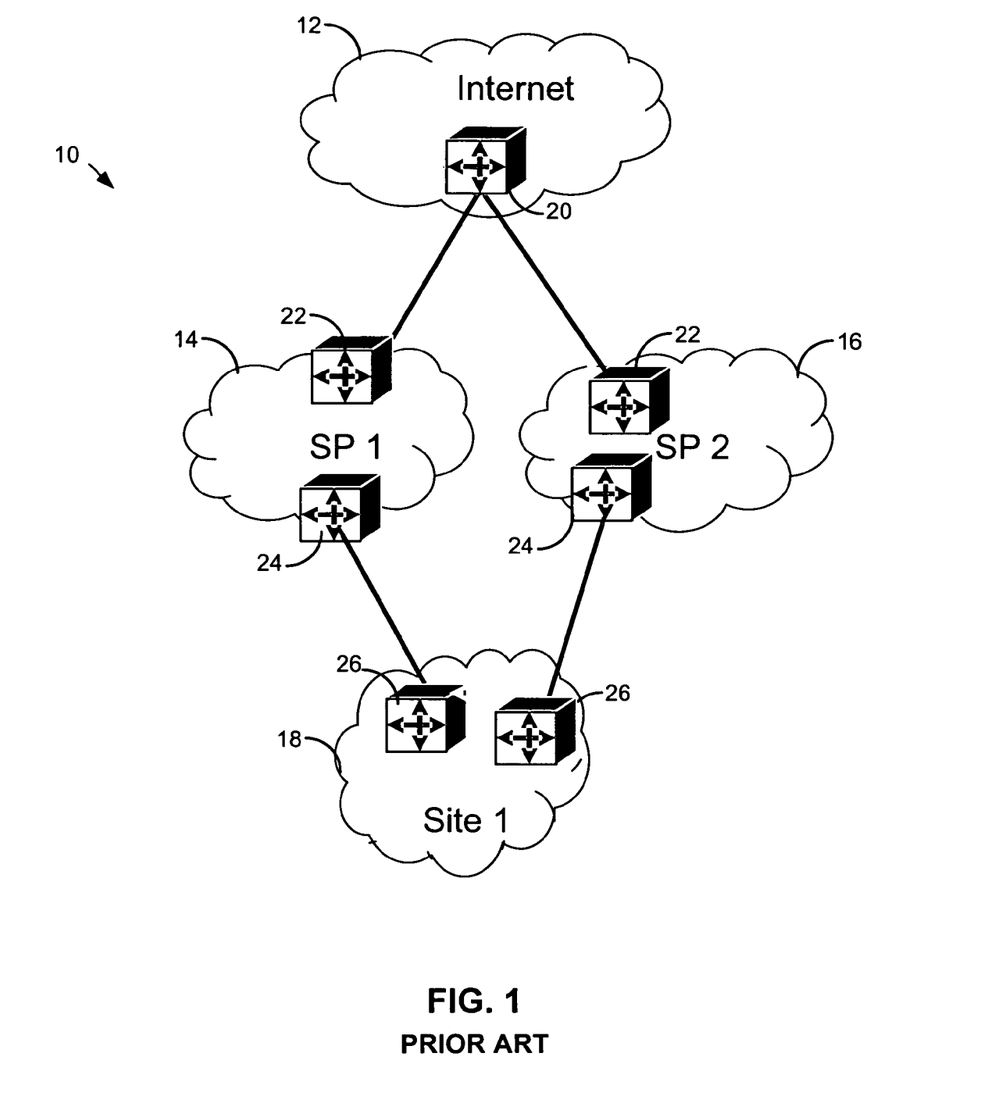
FIG. 1 is a block diagram of a prior art site multi-homing network.

For the purposes of redundancy, load sharing, operational policy or cost, a site may have connections to a communication network, e.g., the Internet, in a multi-homed fashion, with the site's network having connections to multiple Internet service providers ("SP"). In general, as is shown in FIG. 1, site multi-homing is a technique used to increase the reliability of an Internet connection for an organization, such as an Internet Protocol ("IP") network 18 (e.g., Site Z), by connecting to multiple Internet SPs 14, 16 for the purposes of IP path redundancy. Site multi-homing is a growing trend in the Internet Protocol version 4 ("IPv4") Internet and it is anticipated that this trend will continue. As the demand for site multi-homing increases, it creates a very serious route explosion addressing problem in the core of the Internet.

Routing table size has been a major issue for IPv4 networks, and is anticipated to be an even larger issue for Internet Protocol version 6 ("IPv6") networks. As IPv6 addresses are 4 times larger in bit width, i.e., size, than IPv4, the routing table size issue in IPv6 networks has more serious negative effects on router memory usage, as well as routing table lookup performance. To cope with this problem, the IPv6 addressing architecture is designed to have the potential to take advantage of aggregated routing announcements to reduce the number of routes in the default-free zone ("DFZ"). Also, the IPv6 backbone ("6bone") operation guideline (which is the currently-practiced guideline for IPv6 network operation) suggests that Autonomous Systems ("AS") withhold announcing non-aggregatable announcements to the default-free zone, unless there is a special agreement with the peer.

In IPv4, a multi-homed site uses either of the following techniques to achieve better reachability—(1) obtain a portable IPv4 address prefix, and announce it from multiple upstream providers; or (2) obtain a single IPv4 address prefix from a first SP (e.g., SPA 14) and announce it from multiple upstream providers to which the specific site is connected. Since the above two methodologies effectively inject additional routes to the worldwide routing table, they have a negative impact on the worldwide routing table size issue. In addition, the two methodologies also are not compatible with current IPv6 operational goals.

Figure 2:
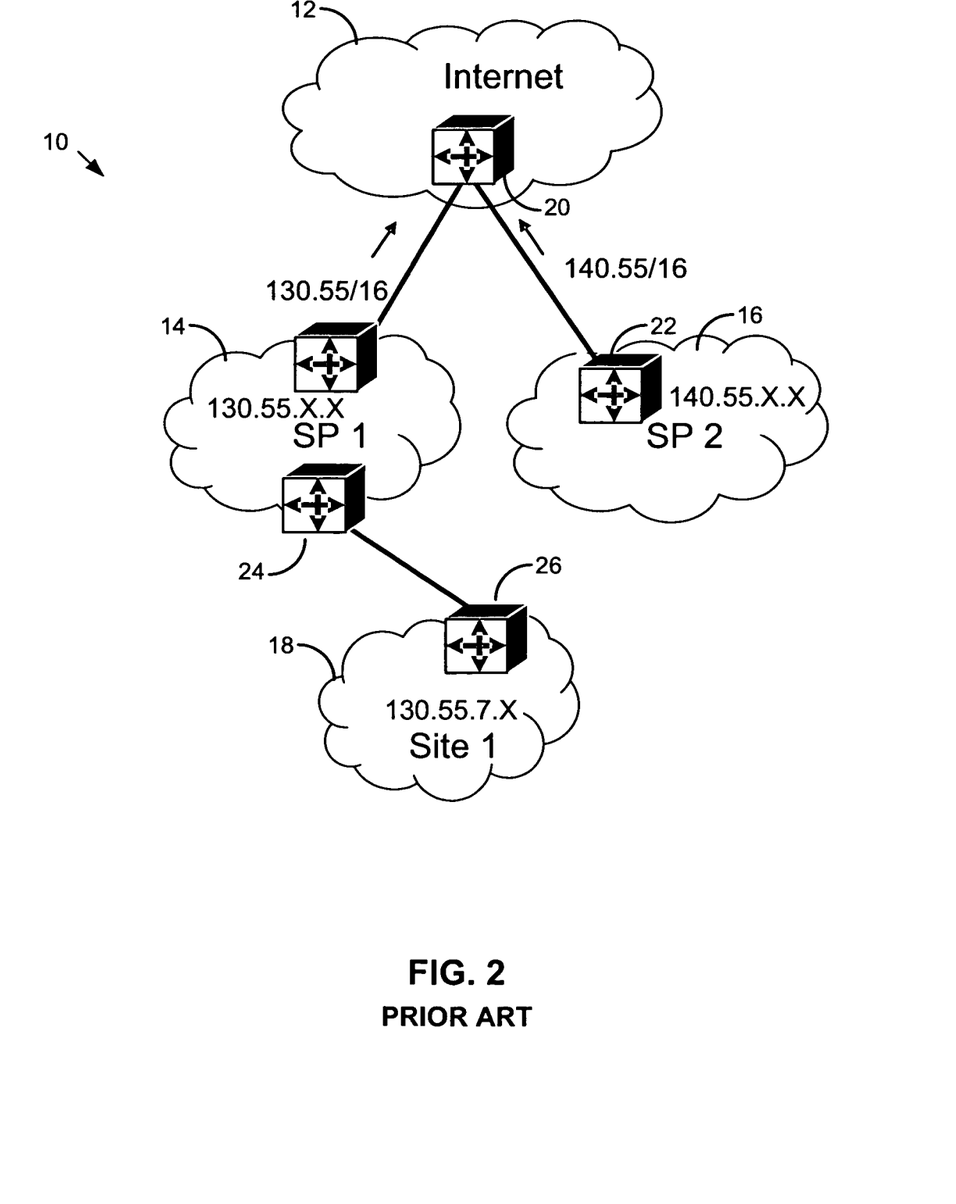
FIG. 2 is a block diagram of a prior art site having provider allocated ("PA") addressing with route aggregation.

When a site is allocated its IP address, generally it comes from its SP's block of addresses and is commonly referred to as Provider Allocated ("PA") addressing. FIG. 2, illustrates this situation where the SPA 14 advertises addresses to its peers 12, 16 by advertising a single aggregate route address, 130.55/16. In this example, Site Z's 18 specific individual site address, 130.55.7.X does not have to be advertised by SPA 14 because this address is included in the aggregate route address. Aggregate route addressing reduces the routing and forwarding tables in the core of the Internet and keeps "address churn" to a minimum. As the transition to IPv6 occurs, the aggregation ratio may reach as high as 64,000 to 1 (64K:1) for a single SP.

Figure 3:
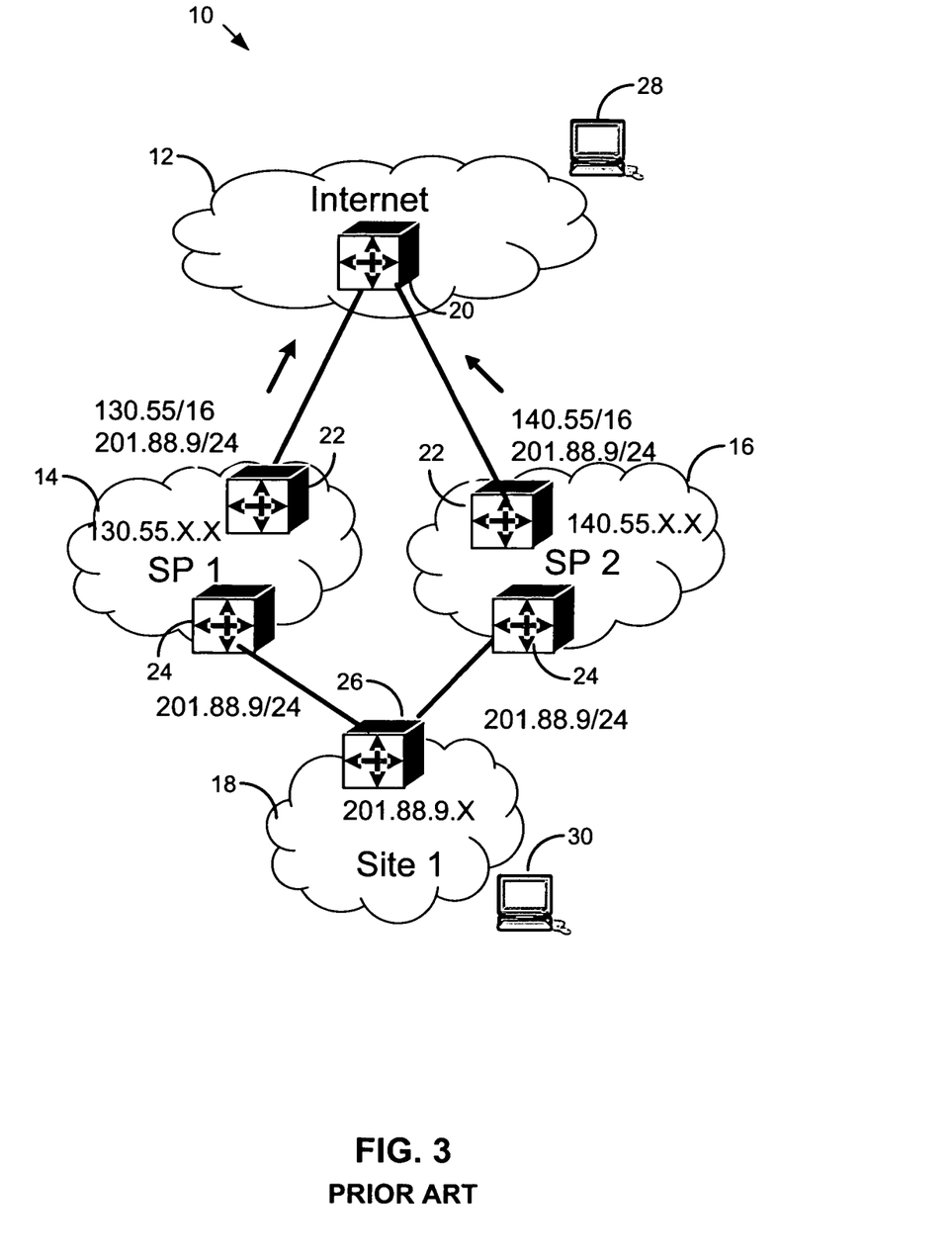
FIG. 3 is a block diagram of a prior art site using provider independent ("PI") addressing with non-aggregatable and non-scalable multi-homing.

Currently, Internet routing infrastructure permits multi-homing by using provider independent ("PI") addressing, and adapts to changes in the availability of these connections. An example of the PI addressing is illustrated by the system 10 in FIG. 3. Several drawbacks of the PI addressing scheme are no aggregation of PI addresses, it is a temporary solution, it is a nonscalable solution, and pursuant to a American Registry for Internet Numbers ("ARIN") policy, only very large sites are permitted to obtain PI addresses, and thus it fails to support the thousands of smaller sites desiring multi-homing capability.

Another proposed solution is the use of site multi-homing by IPv6 intermediation ("Shim6"), which is a host-to-host based protocol where the site has a PA prefix from each upstream SP and each host derives addresses from each of these prefixes. The host then negotiates with the far end of the connection to establish failover protection. If there is a failure, the host uses the alternate address for all active and new sessions. Shim6 is fairly controversial and has not been widely accepted by the Internet community as Shim6 presents numerous problems including forcing servers to retain large amounts of state tables in order to maintain site multi-homed connections; significantly increases each host's complexity and thereby results in increased service calls to service providers; lacks centrally controlled traffic engineering, increases the difficulty in setting up filters and security when an address changes, and requires both ends of route to be Shim6 capable which results in a site not having full control of its redundancy policy.

Request for comments ("RFC") 3178 describes another proposed site multi-homing solution involving a tunneling method that provides tunneling back to the primary service provider ("SP") through a secondary SP in the case of a failure. This solution has been available for IPv4 since 2001, however, it is rarely if ever used. Many in the IP networking community view this "solution" as being too complicated to establish, as well as maintain, for both the SP and user. In addition, it does not provide comprehensive coverage for all failure cases, and the failure path can add significant latency to a connection. The RFC 3178 solution will basically have the same issues when applied to IPv6 that it does when applied to IPv4.

Although, the Border Gateway Protocol ("BGP") currently allows routes to be aggregated, it is a completely manual policy configuration process. There is no information in routing advertisements that allows for any automation and therefore the lack of automation or auto routing presents several problems, such as operators requiring very detailed network information about aggregate prefixes advertised throughout the Internet, but this information is changing constantly as SPs are added and/or deleted. Moreover, there are large numbers of complex policies which must be configured and the routing calculations (convergence) slows down as the number and complexity of policies increases and any incorrect policy can cause misrouting.

What is desired is an arrangement under which multi-homing can be fully implemented without significant impact on the worldwide routing table size, or the interior gateway protocol ("IGP") routing table size of upstream Internet SPs.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

The present invention advantageously provides a method, system and apparatus for aggregating multiple site-specific routes, by determining a first aggregate-aware route that includes a prefix of a site-specific address and a prefix length of an aggregate route address of a first service provider. The method and system can be implemented as an enhancement to existing IP protocols, such as BGP and other inter-domain routing protocols, as well as intra-domain routing protocols.

In accordance with one aspect, the present invention provides a method for aggregating multiple site-specific routes, by determining a first aggregate-aware route that includes a prefix of a site-specific address and a prefix length of an aggregate route address of a first service provider. The method may further include applying a routing protocol policy in which an aggregate route may serve as a proxy for an aggregate-aware route when the address of the aggregate route matches the address of the aggregate-aware route. The method may further comprise that the routing protocol policy includes determining that the aggregate-aware route address has a route preference flag and that this route preference flag indicates that an aggregate route is to serve as a proxy for an aggregate-aware route. The method may yet further include determining a second aggregate-aware route that includes the prefix length of the aggregate route address of the first service provider and a prefix length of a second aggregate route address of a second service provider. The method may yet still further include determining a first aggregate-aware route that includes at least two autonomous system identifiers from a multi-homing zone and a multi-homing zone diameter.

In accordance with another aspect, the present invention provides an apparatus for aggregating multiple site-specific routes. The apparatus for aggregating multiple site-specific routes having a storage device for storing a site-specific address and an aggregate route address of a first service provider, and a central processing unit which operates to determine a prefix of a site-specific address and a prefix length of an aggregate route address of a first service provider, and to determine a first aggregate-aware route. The apparatus may further provide that the processor determine that the routing protocol policy includes determining that the aggregate-aware route address has a route preference flag and that this route preference flag indicates that an aggregate route is to serve as a proxy for an aggregate-aware route. The apparatus may further provide that the processor determine a second aggregate-aware route that includes the prefix of the aggregate route address of the first service provider and a prefix length of a second aggregate route address of a second service provider. The apparatus may yet still further include determining a first aggregate-aware route that includes at least two autonomous system identifiers from a multi-homing zone and a multi-homing zone diameter.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 4:
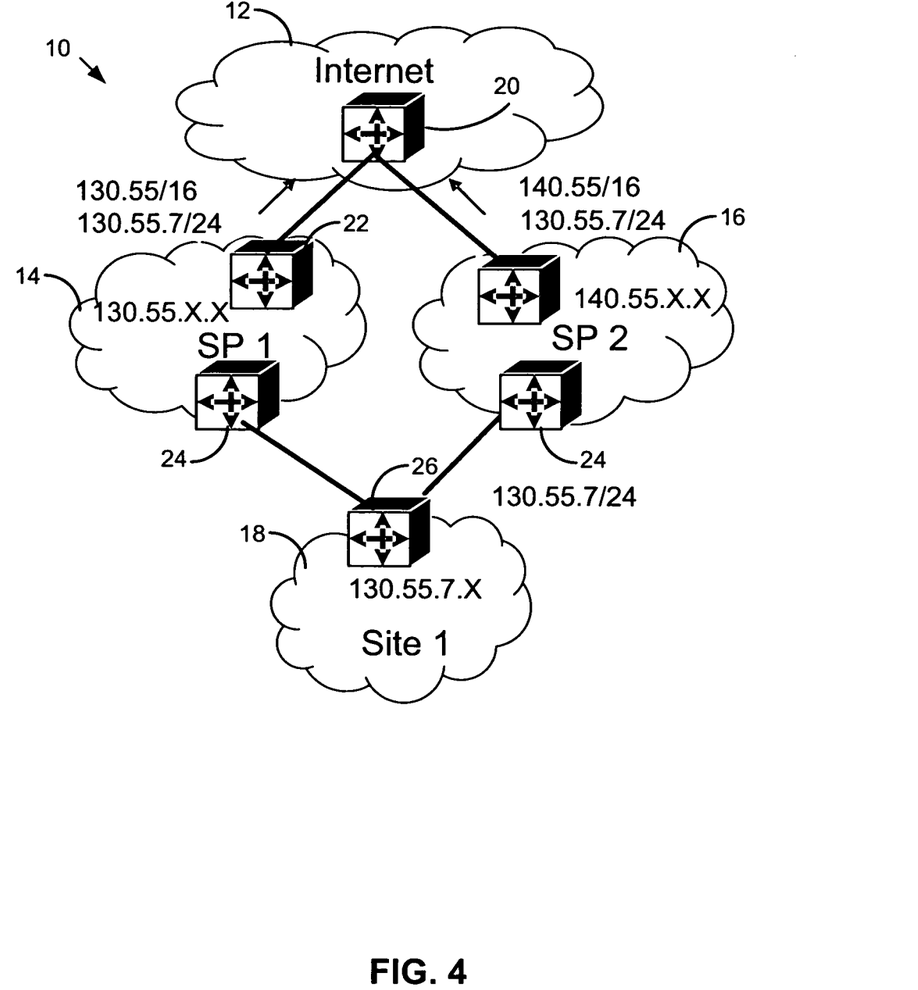
FIG. 4 is a block diagram of a system using multi-homing and aggregation.

Referring again to the drawing figures in which like reference designators refer to like elements, there is shown in FIG. 4 a block diagram of a system, designated as system 10 illustrating multi-homing and aggregation functionality in accordance with the principles of the present invention. Site Z 18 in this example is to be multi-homed through SPA 14 and SPB 16. This requires SPB 16 to advertise the specific address 130.55.7/24 to its peers, since SPB 16 cannot aggregate this address.

When writing IP addresses in strings the most common notation is the dot-decimal notation, for example, 130.55.7.0. Each block of an IPv4 address is a decimal number ranging from zero (0) to two hundred fifty-five (255). Addressing notation may be further described by use of the classless inter-domain routing ("CIDR") standard, which is a bitwise, prefix-based standard for the interpretation of IP addresses. The CIDR standard facilitates routing by allowing blocks of addresses to be grouped together into single routing table entries. These groups, commonly called CIDR blocks, share an initial sequence of bits in the binary representation of their IP addresses. IPv4 CIDR blocks are identified using a syntax similar to that of IPv4 addresses, that is a one to four-part dotted-decimal address, followed by a slash ("/"), then a number from 0 to 32 (E.F.G.H/N). The dotted decimal portion is interpreted as a 32-bit binary number that has been broken into four 8-bit bytes. The number following the slash is the prefix length, the number of shared initial bits, counting from the left-hand side of the address. When speaking in abstract terms, the dotted-decimal portion is sometimes omitted, thus a "/20" is a CIDR block with an unspecified 20-bit prefix. For a site-specific address of 130.55.7/24, the prefix length is 24 bits.

Referring again to the example shown in FIG. 4, in addition to advertising its aggregate address of 130.55/16, SPA 14 must also advertise the specific site address of 130.55.7/24, otherwise all traffic going to Site Z 18 would flow through SPB 16 using the longest route policy rule. As a result of the multi-homing and aggregation, the number of routes in the core of the Internet will be in the order of:

Number of SPs+(2*number of multi-homed sites)

Also, each time Site Z's connectivity to either SP changes, that change is propagated throughout the Internet, which causes the forwarding tables to be recalculated. This creates significant amounts of route flapping in the Internet and results in protracted routing table convergence times.

Figure 5:
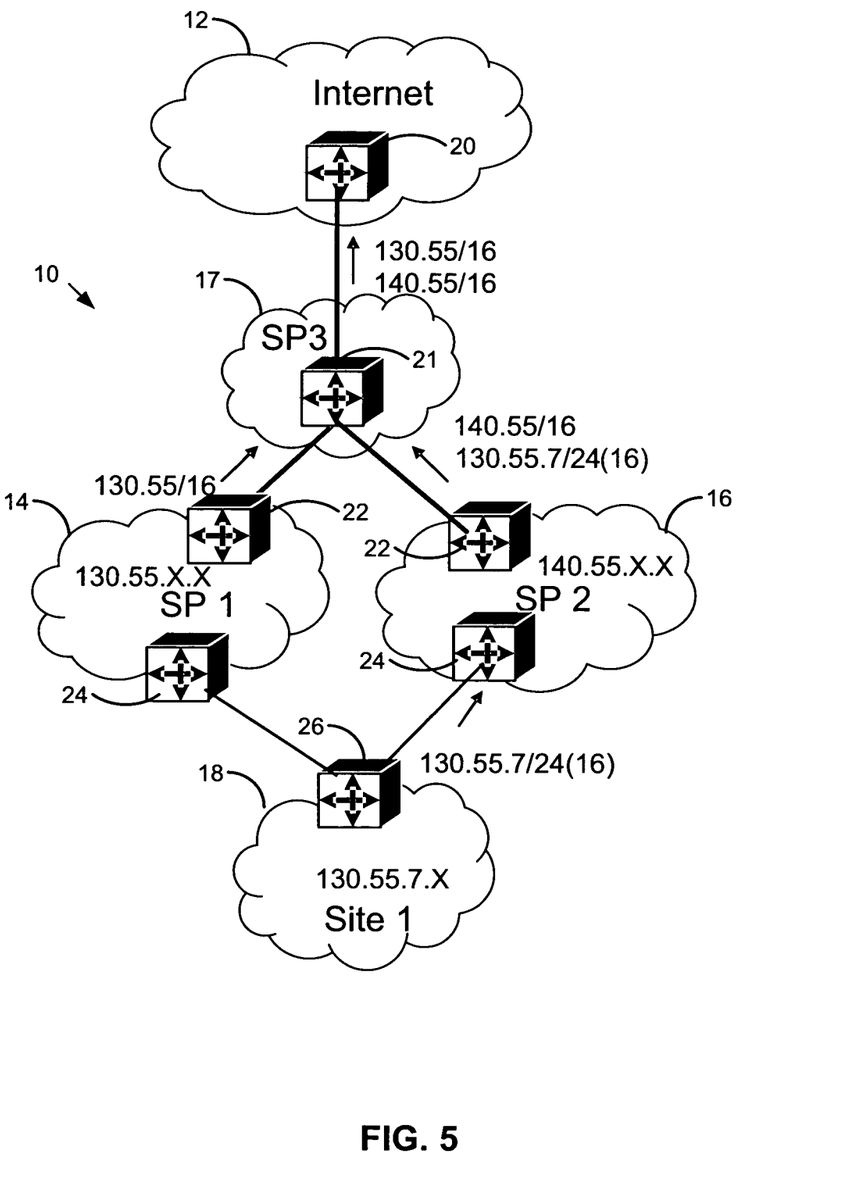
FIG. 5 is a block diagram of a system having aggregate-aware ("AA") routes in accordance with one embodiment of the present invention.

FIG. 5 illustrates a block diagram of a system 10 having aggregate-aware ("AA") routes in accordance with one embodiment of the present invention. These aggregate-aware ("AA") routes explicitly carry the aggregate prefix or subnet of the SP 14, 16, 17 that allocated the site address.

As shown in FIG. 5, there are three SPs 14, 16 and 17 providing address aggregation. In this embodiment, Site Z 18 has a specific site address of 130.55.7/24 but its aggregate-aware route will also include or "carry" the aggregate route prefix or subnet length of the service provider 14, 16, 17 that allocated the site address. In this example the fully defined AA route address is shown as 130.55.7/24(16) wherein the prefix length of the site address is ("/24") and the prefix length of the aggregate from which the site address was allocated is ("/16"). SPC 17 is defined as an aggregation point, and it can have a BGP policy ("PI") that allows the aggregate route 130.55/16 to act on behalf of any aggregate-aware ("AA") route that exactly matches the aggregate route. In this example, since the aggregate route of 130.55.7/24(16) is 130.55/16, the policy P1 will apply and the AA route is not explicitly advertised. Alternatively, SPC 17 could have a general BGP policy ("P2") that allows any aggregate route to act on behalf of any AA route conditioned upon the finding there is an exact aggregate route match. Various other standard BGP policy criteria may be added to P1 and/or P2 to determine whether an aggregate route can act on behalf of an AA route (for example, autonomous system ("AS") path length comparisons).

In another embodiment, the AA route could carry an optional flag to make it less preferred than its aggregate route. If the specific aggregate address is known by a router or route reflector, it is installed in the forwarding table even though it may have a shorter path length (and in violation of the maximum path length policy or rule). The AA route is only installed or advertised in the event the aggregate becomes withdrawn. In this embodiment, if an aggregate is ever withdrawn, the specific AA routes need to be advertised.

Figure 6:
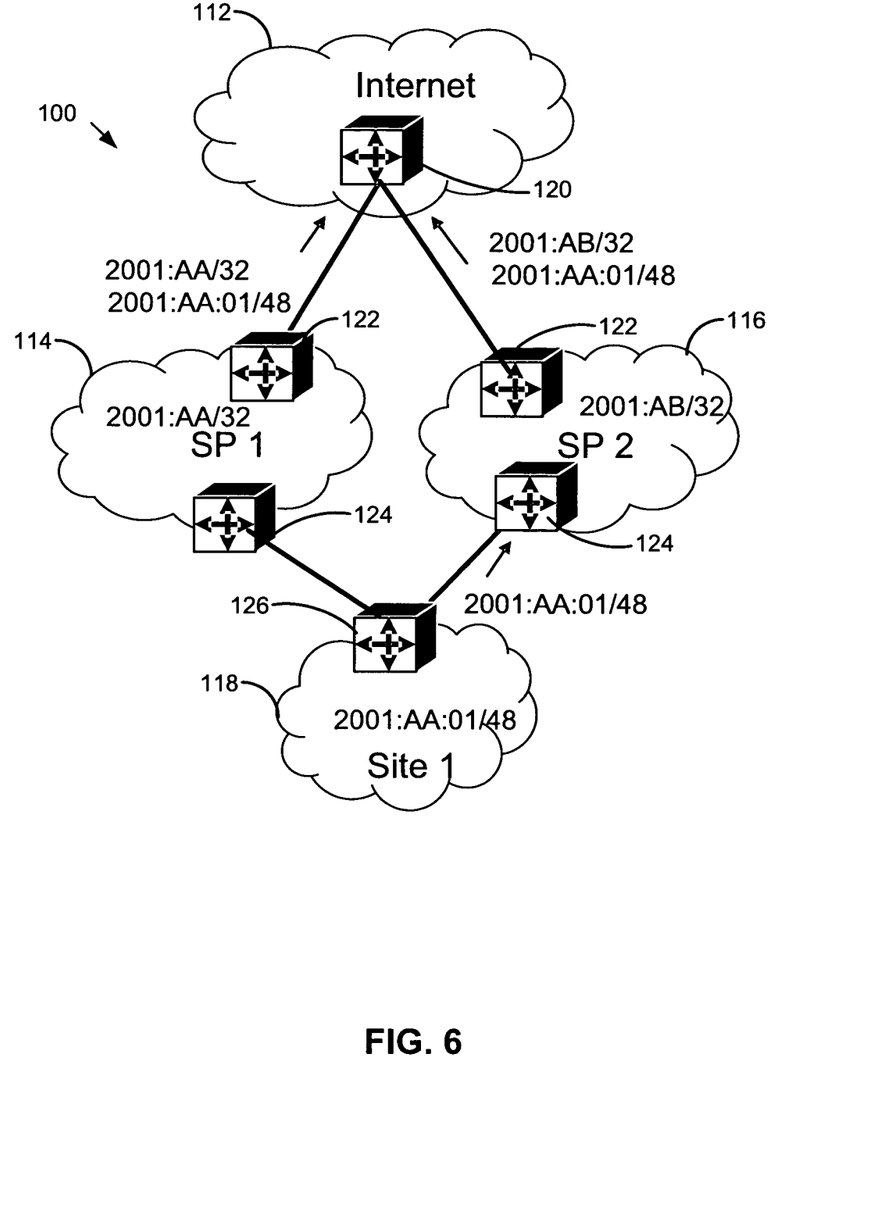
FIG. 6 is a block diagram of a site using multi-homing and aggregation in accordance with an IPv6.

FIG. 6 illustrates another embodiment of the invention wherein the IP network uses an IPv6 format. IPv6 addresses are 128-bits in length (long) and they are typically written as eight groups of four hexadecimal digits. For example, 2001:00AA:0001:0000:0000:0000:CDEF:AD12 is a valid IPv6 addresses. If a four digit group is 0000, the zeros may be omitted. Thus the above valid IPv6 address may be shortened as 2001:00AA:0001::CDEF:AD12. Moreover, leading zeros in a group can be omitted, and thus 2001:00AA:0001::CDEF:AD12 may be further shortened to 2001:AA:1::CDEF:AD12. Similar to IPv4 addressing, IPv6 networks may be written using CIDR notation. For an IPv6 network having a contiguous group of IPv6 addresses, the initial bits of addresses that are identical for all hosts in the network are called the network's prefix, and may be denoted by the first address in the network and the size in bits of the prefix, separated with a slash ("/"). As illustrated in FIG. 6, Site Z 118 in this example seeks to be multi-homed through SPA 114 and SPB 116. This requires SPB 116 to advertise the specific address 2001:AA:01::/48 to its peers, because SPB 116 cannot aggregate this address. In addition, SPA 114 is also forced to advertise the specific site address, otherwise all traffic going to Site Z 118 would flow through SPB 116 because of the longest route match rule (BGP policy).

Figure 7:
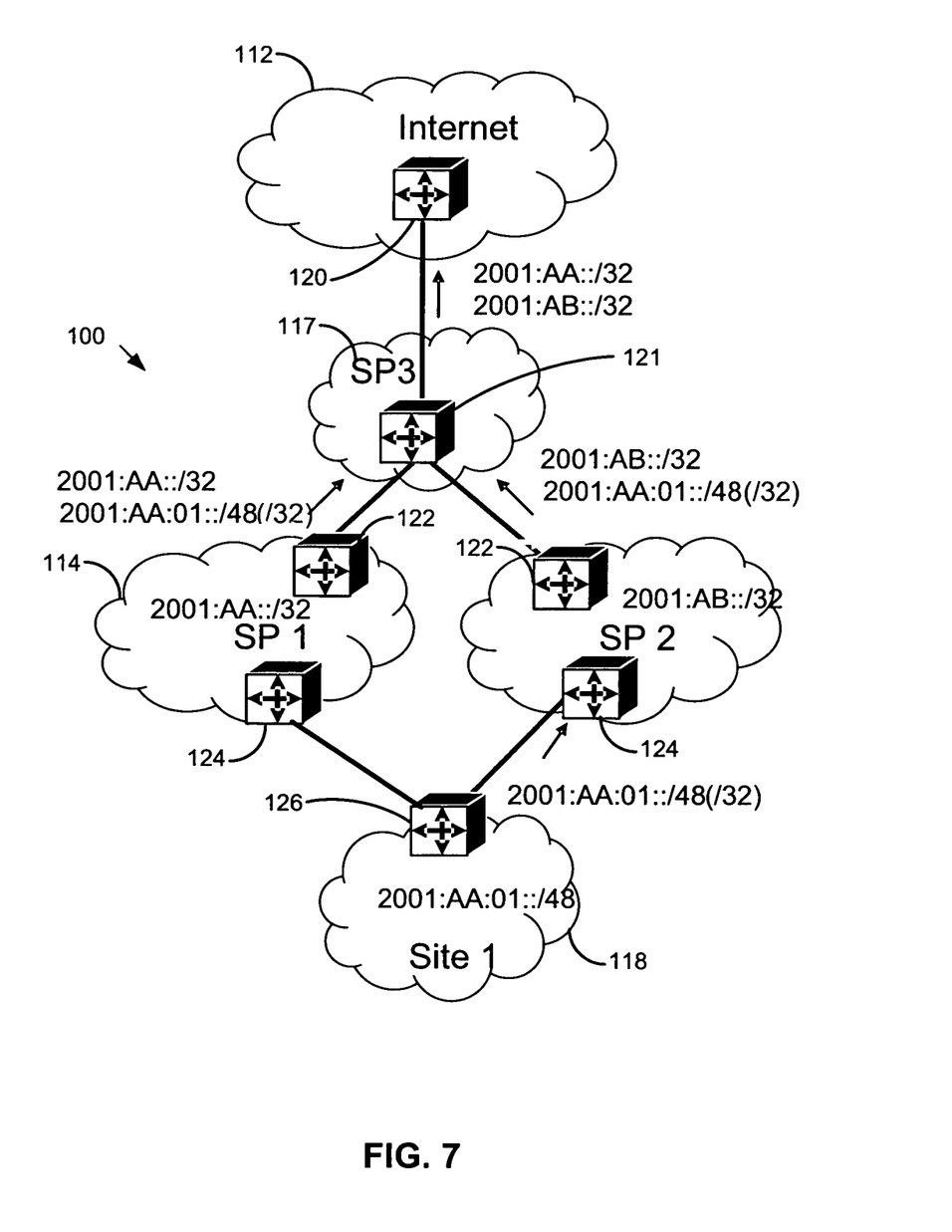
FIG. 7 is a block diagram of a system having aggregate-aware ("AA") routes in accordance with one embodiment of the present invention.

Referring to FIG. 7, another embodiment of the aggregate-aware ("AA") route functionality of the invention is provided wherein the IP format is IPv6. In this example, the fully defined AA route address is shown as 2001:AA:01::/48(32) as advertised from Site Z 118 and includes both the prefix length of the site (/48) as well as the prefix length of the aggregate from which the site address was allocated (/32). SPC 117 is defined as an aggregation point, and it can have a BGP policy ("P1") that allows the aggregate route 2001:AA::/32 to act on behalf of any aggregate-aware ("AA") route that exactly matches the aggregate route.

In this example, the aggregate route of 2001:AA:01::/48 (32) is 2001:AA::/32, therefore the policy P1 applies, and the AA route is not explicitly advertised. Alternatively, SPC 117 could have general BGP policy ("P2") that allows any aggregate route to act on behalf of any AA route conditioned upon the finding there is an exact aggregate route match. Various other standard BGP policy criteria may be added to P1 and/or P2 to determine whether an aggregate route is to act on behalf of an AA route (for example, autonomous system ("AS") path length comparisons). In such an example, a route preference flag could indicate that an aggregate route will serve as a proxy for an aggregate-aware route.

Figure 8:
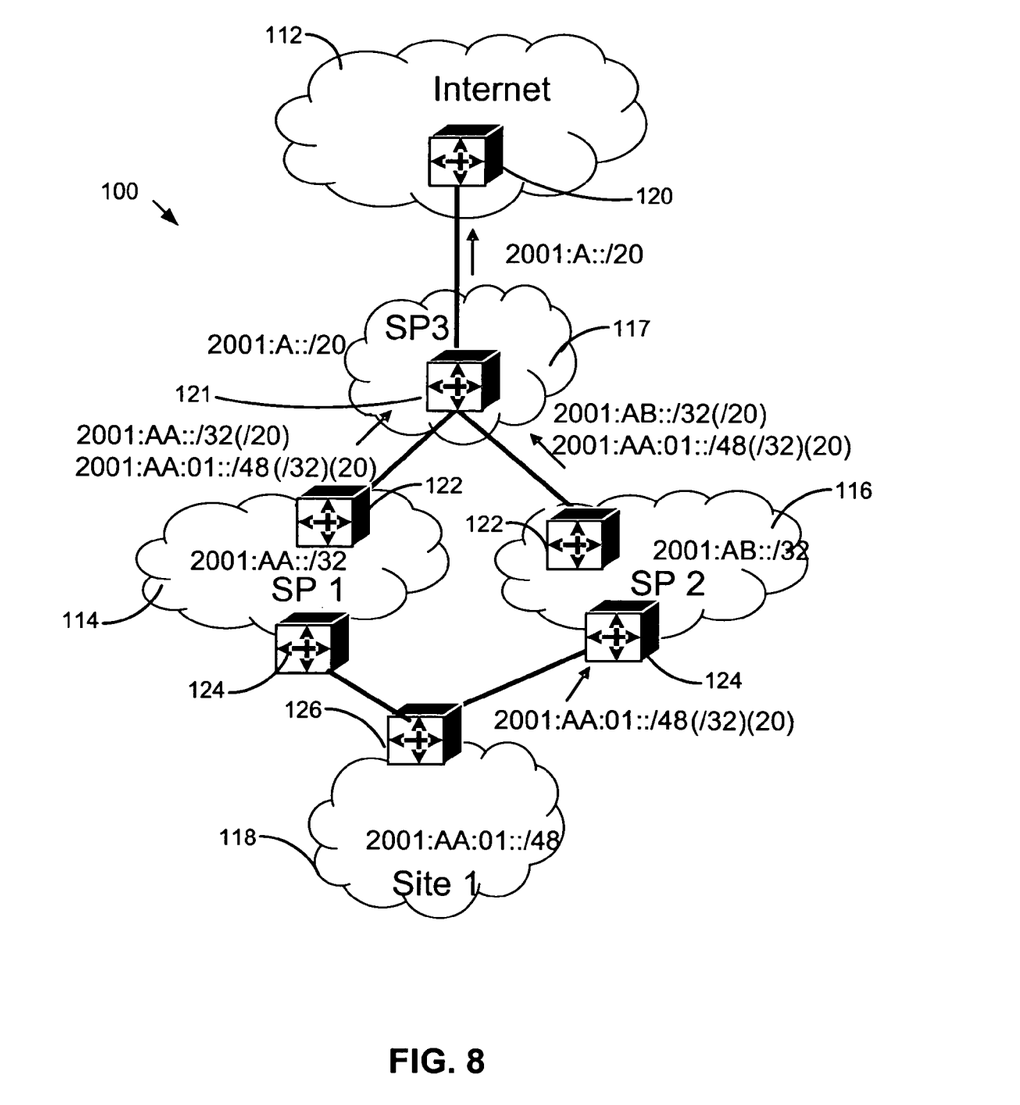
FIG. 8 is a block diagram of a system having multiple levels of aggregation in accordance with one embodiment of the present invention.

Referring to FIG. 8, another embodiment of the AA routing system 100 is illustrated wherein the system 100 is a hierarchical addressing system with multiple levels of addressing aggregation. In this example, as illustrated in FIG. 8, SPC 117 has been allocated a prefix of 2001:A::/20. SPC 117 has allocated the two sub-prefixes of 2001:AA::/32 and 2001:AB::/32 to SPA 114 and SPB 116 respectively. SPA 114 has allocated 2001:AA:01::/48 from its block of addresses to Site Z 118. Site Z 118 can advertise an AA route 2001:AA:01::/48 (32)(20) which contains its prefix and the prefixes of one or more of its upstream aggregate prefixes, and provides additional information that can be used to consolidate routes as they are advertised away from the sites location.

SPA 114 also can advertise an AA route 2001:AA::/32 (20) which contains its prefix and the prefix of the block from which it was allocated. The site edge or customer edge ("CE") router (or route reflector) 126 needs to be configured with the aggregate prefix of the allocating SP 114, 116, 117. Presently one of the ways for a CE router (or route reflector) 126 to learn its allocated prefix (e.g. 2001:AA:01::/48) is to have that address delegated from a Dynamic Host Configuration Protocol ("DHCP") server, typically from within the SP's domain. The DHCP prefix delegation protocol requires updating to include the aggregate prefix as well as the site-specific prefix (e.g. 2001:AA:01::/48 (32)).

DHCP is one specific mechanism that allocates a prefix. Other network services such as domain name system ("DNS") or other management systems may provide the same function.

The embodiments illustrated by FIGS. 5, 7 and 8 provide aggregate-aware route addressing schemes to overcome the multiples deficiencies of the current BGP protocol and provide arrangements under which multi-homing can be fully implemented without significant impact on the worldwide routing table size, or the interior gateway protocol ("IGP") routing table size of upstream Internet SPs.

Figure 9:
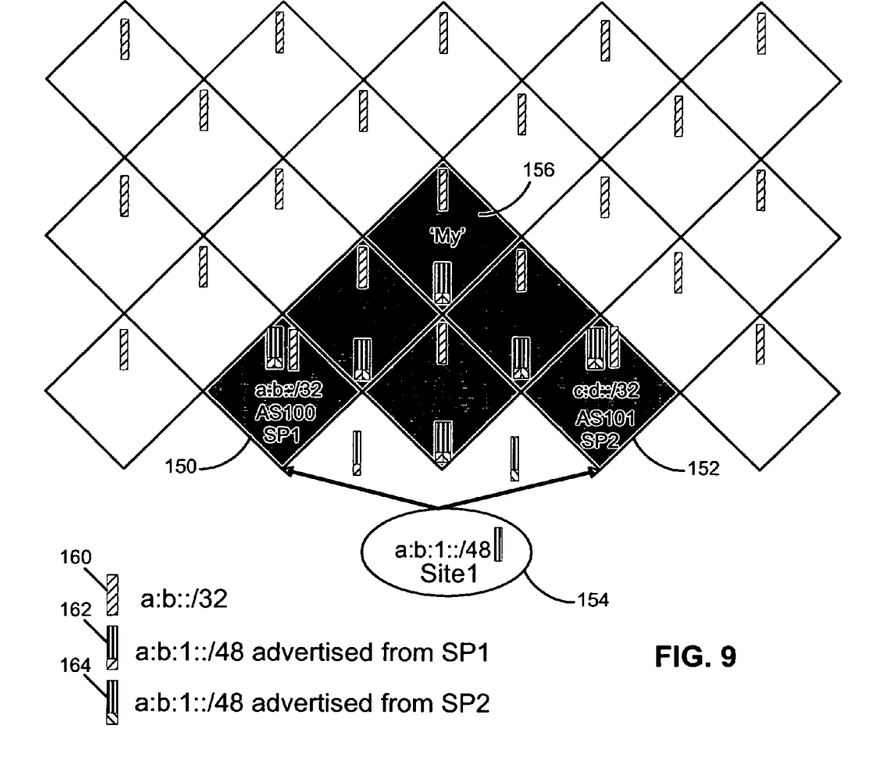
FIG. 9 is a block diagram of a system having multi-homing zones in accordance with one embodiment of the present invention.

FIG. 9 illustrates another embodiment of a site multi-homing system in accordance with the present invention. Each diamond of FIG. 9 may represent a server provide ("SP") or any other autonomous system ("AS"). The adjoining corner or side of each diamond acts as a peering point between the SPs. SPA ("AS100") 150 has an assigned prefix block of a:b::/32 that is advertised throughout the network. SPB ("AS101") 152 has an assigned prefix block of c:d::/32 that is advertised throughout the network. Site Z 154 is multi-homed to SPA 150 and SPB 152 and has a site prefix of a:b:1::/48. In order to simplify FIG. 9, the prefix icons of SPB 152 have been removed. In this embodiment, the two site specific addresses, a:b:1::/48 advertised from SPA 162 and a:b:1::/48 advertised from SPB 164, are advertised to a limited portion of the network as indicated by the grey shaded portion of FIG. 9. This is a limited site prefix distribution model and results in the creation of a multi-homing zone ("MZ"). The aggregate route a:b::/32 remains advertised in the rest of the network and provides a forwarding path for packets addressed to Site Z. The aggregate route 160 can be used to forward the packets into the MZ at which point the packets may be forwarded using one of the specific routes 162, 164. In this way, the MZ defines a limited topological network region over which the site specific routes 162, 164 are advertised and also provides similar or the same forwarding as when the specific routes are distributed Network wide.

Figure 10:
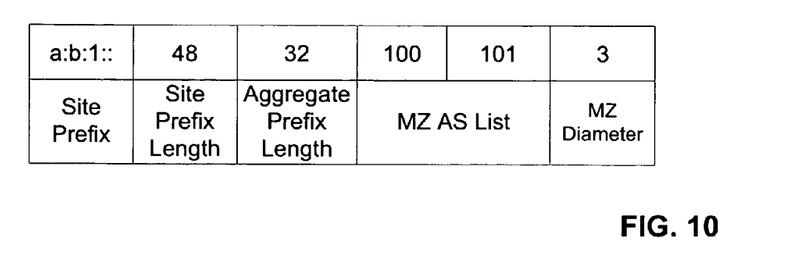
FIG. 10 is a block diagram of an example of a multi-homing zone route in accordance with one embodiment of the present invention.

In general, no SP in the MZ is distanced further from either SPA 150 or SPB 152 than the distance between SPA 150 and SPB 152. In the system illustrated in FIG. 9, the AS path length from SPA 150 to SPB 152 is three and will be referred to as the multi-homed zone ("MZ") diameter. Accordingly, SPs having an AS path length longer than the MZ diameter, in this example it is 3, to either SPA 150 or SPB 152 will be excluded from the MZ. The structure of a MZ route, such as those found in FIG. 9, may be written or defined as illustrated by FIG. 10. In this example, the site specific prefix is shown as "a:b:1::" with a site specific prefix length of "48", an aggregate prefix length of "32", a MZ AS list containing AS100 of SPA 150 and AS101 of SPB 152, and a MZ diameter of 3. Of course the various portions of the MZ route are not limited to the size and quantities illustrated in FIG. 10, but may have site prefixes of various lengths or size, and with various MZ diameters as well. In addition, although the MZ route illustrated in FIG. 10 contains a single aggregate prefix length, it could have multiple aggregate prefix lengths. When an external Border Gateway Protocol ("BGP") speaker receives an MZ route it may perform the following processing. If the aggregate route 160 (e.g., a:b::/32) associated with the MZ route is known; and if the distance from 'My' autonomous system ("AS") 156 to each AS in the AS list is less than or equal to the MZ diameter, then the MZ route is added to the BGP database and the MZ route is advertised to the AS peers. If the distance from 'My' autonomous system ("AS") to any AS in the AS list is greater than the MZ diameter, then the MZ route is filtered (e.g., discarded) and not advertised to the AS peers. In the event that the aggregate route 160 associated with MZ route is not known, the MZ route is added to the BGP database and the MZ route is advertised to the AS peers.

Figure 11:
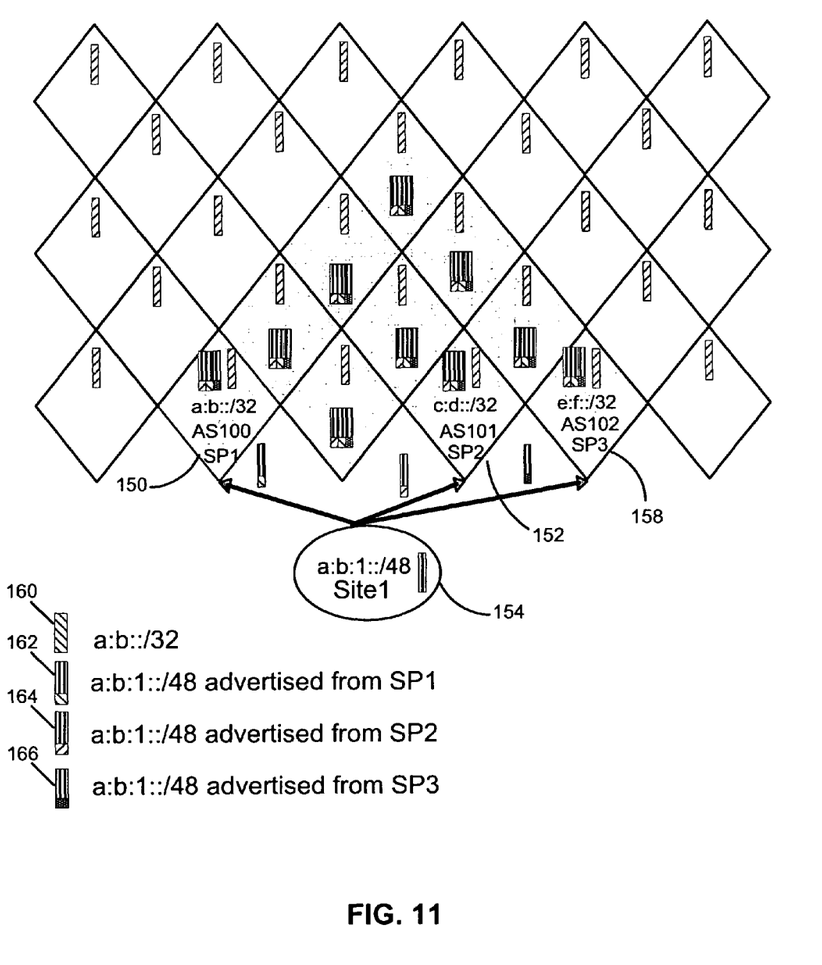
FIG. 11 is a block diagram of a system having more than two service providers providing multi-homing service in accordance with one embodiment of the present invention.

FIG. 11 illustrates an embodiment of the invention in which two or more SPs (e.g., 150, 152 and 158) provide multi-homing service to a site (e.g., Site Z 154). In this embodiment, Site Z 154 is multi-homed to SPA 150, SPB 152 and SPC 158 and has a site prefix of a:b:1::/48. In this example, the three site specific addresses, a:b:1::/48 advertised from SPA 162, a:b:1::/48 advertised from SPB 164, and a:b:1::/48 advertised from SPC 166 are advertised to a limited portion of the network as indicated by the grey shaded portion of FIG. 11. In this embodiment, the minimum diameter of the MZ is defined as the furthest distance between any two participating SPs (e.g., 150 and 158) which in this example would be 4. In this case, the MZ route will include the AS numbers that are furthest apart (e.g., AS100 and AS102) but may also include a list of all or part of the participating AS numbers. The BGP processing of FIG. 11 is similar to the BGP processing discussed with respect to FIGS. 9 and 10.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for aggregating multiple site-specific routes, the method comprising:
   determining a first aggregate-aware route at a first service provider, the first aggregate-aware route including a prefix of a site-specific address, a prefix length of the site-specific address and a prefix length of an aggregate route address of the first service provider.

2. The method of claim 1, wherein determining the first aggregate-aware route includes applying a routing protocol policy.

3. The method of claim 2, wherein the routing protocol policy allows an aggregate route to serve as a proxy for the first aggregate-aware route when an address of the aggregate route matches the address of the first aggregate-aware route.

4. The method of claim 2, wherein the routing protocol policy includes determining that the first aggregate-aware route address has a route preference flag, the route preference flag indicating that an aggregate route is to serve as a proxy for the first aggregate-aware route.

5. The method of claim 1, further comprising:
   determining a second aggregate-aware route that includes the prefix of the aggregate route address of the first service provider and a prefix length of a second aggregate route address of a second service provider.

6. The method of claim 5, wherein determining the second aggregate-aware route includes applying a routing protocol policy.

7. The method of claim 6, wherein the routing protocol policy includes allowing the second aggregate route to serve as a proxy for the first aggregate-aware route when the address of the second aggregate route matches the address of the first aggregate-aware route.

8. The method of claim 1, wherein the first aggregate-aware route further includes at least two autonomous system identifiers from a multi-homing zone.

9. The method of claim 8, wherein the first aggregate-aware route further includes a multi-homing zone diameter.

10. An apparatus for aggregating multiple site-specific routes, the apparatus comprising:
   a storage device, the storage device storing a site-specific address and an aggregate route address of a first service provider; and
   a central processing unit, the central processing unit operating to determine a first aggregate-aware route including a prefix of a site-specific address, a prefix length of the site-specific address and a prefix length of the aggregate route address of the first service provider.

11. The apparatus of claim 10, wherein the apparatus is a router.

12. The apparatus of claim 10, wherein determining the first aggregate-aware route includes applying a routing protocol policy.

13. The apparatus of claim 12, wherein the routing protocol policy allows the aggregate route to serve as a proxy for the first aggregate-aware route when the address of the aggregate route matches the address of the aggregate-aware route.

14. The apparatus of claim 12, wherein the routing protocol policy includes determining that the first aggregate-aware route address has a route preference flag, the route preference flag indicating that an aggregate route is to serve as a proxy for the first aggregate-aware route.

15. The apparatus of claim 10, the processor further comprising determining a second aggregate-aware route that includes the prefix of the aggregate route address of the first service provider and a prefix length of a second aggregate route address of a second service provider.

16. The apparatus of claim 15, wherein determining the second aggregate-aware route includes applying a routing protocol policy.

17. The apparatus of claim 10, wherein the first aggregate-aware route further includes at least two autonomous system identifiers from a multi-homing zone.

18. The apparatus of claim 17, wherein the first aggregate-aware route further includes a multi-homing zone diameter.

19. A storage medium storing a computer program which when executed by a processing unit performs a method for aggregating multiple site-specific routes, the method comprising:
   determining a first aggregate-aware route at a first service provider, the first aggregate-aware route including a prefix of a site-specific address, a prefix length of the site-specific address and a prefix length of the aggregate route address of the first service provider.

20. The storage medium of claim 19, wherein determining the first aggregate-aware route includes applying a routing protocol policy.

21. The storage medium of claim 20, wherein the routing protocol policy allows the aggregate route to serve as a proxy for the first aggregate-aware route when the address of the aggregate route matches the address of the first aggregate-aware route.

22. The storage medium of claim 20, wherein the routing protocol policy includes determining that the first aggregate-aware route address has a route preference flag, the route preference flag indicating that an aggregate route is to serve as a proxy for the first aggregate-aware route.

23. The storage medium of claim 19, further comprising determining a second aggregate-aware route that includes the prefix of the aggregate route address of the first service provider and a prefix length of a second aggregate route address of a second service provider.

24. The storage medium of claim 23, wherein determining the second aggregate-aware route includes applying a routing protocol policy.

25. The storage medium of claim 19, wherein the first aggregate-aware route further includes at least two autonomous system identifiers from a multi-homing zone.

26. The storage medium of claim 25, wherein the first aggregate-aware route further includes a multi-homing zone diameter.

* * * * *